2,707,692

RUBBER COATED WITH ALKYL AMINE BENTONITE AND PROCESS OF MAKING SAME

Ludwig J. Hecht and John P. Emmerling, Baltimore, Md., assignors to The National Chemical & Plastics Company, Baltimore, Md., a corporation of Maryland No Drawing. Application January 19, 1954, Serial No. 405,029

10 Claims. (Cl. 117—139)

This invention relates to non-tacky rubber and process of making same.

The objectionable tackiness and adhesion to each other of rubber surfaces is well known to the art and to overcome this surface tack various treatments with other materials have been given the rubber either before or after vulcanization. These materials, e. g. talc, starch, graphite, mica, clay, soaps, etc., used as powder or in liquid suspension, impart to the rubber surface uneven and unsightly appearance. Furthermore, the use of these materials in powdered form presents a dust nuisance.

Among the objects of this invention is the overcoming of the above disadvantages and production of a finished rubber product that is non-tacky and of improved color.

A further object of this invention is to produce a permanent non-tacky finish that will result in a velvety flat or off-gloss surface on vulcanized as well as non-vulcanized soft rubber.

A still further object of this invention is to produce a permanent, non-tacky, flat or off-gloss finish on soft rubber that will prevent adhesion of rubber surfaces which touch each other, even during vulcanization.

Other, further and more specific objects of this invention will become readily apparent to persons skilled in the art from a consideration of the following description.

In practicing this invention, soft or semi-soft rubber is treated with a solution of an organic modified clay which gels in organic solvents or solvent systems. A specimen of such a treated clay is octadecylammonium bentonite, which is an organophylic bentonite containing 18 carbon atoms in the amine chain.

A suitable method of preparing the octadecylammonium bentonite is the process disclosed in United States Patent 2,531,825 to Peterson and Muller wherein 600 g. of a Wyoming bentonite is added to 18 liters of water and the slurry allowed to stand for 2 hours to settle out the non-clay impurities. 9.9 g. (0.1 mol) of 36% concentrated HCl is added to 26.95 g. (0.1 mol) of octadecylamine, and the octadecylammonium chloride formed is then dissolved in 3 liters of hot water. The hot solution is added to 2924 ml. of the grit-free bentonite slurry. The precipitate is filtered, washed, dried and pulverized.

Other alkylamine bentonites may be prepared by the foregoing method by substituting the corresponding alkylamine for the octadecylamine.

*Example I*

0.5% by weight of octadecylammonium bentonite is slurried with 5% of aromatic naphtha and then 0.5% methyl alcohol is added slowly under vigorous agitation to produce a gel. To this are added 45% aromatic naphtha and 49% ethyl alcohol.

The resulting gel is applied to the rubber surface by any suitable method such as brushing, spraying, dipping, wiping, roller or knife coating, etc., and allowed to dry, no heating being required. This will result in a non-tacky finish on the rubber surface. The non-vulcanized rubber so treated may, if desired, be then vulcanized and the resulting surface is also non-tacky. During this vulcanization, the rubber suffers no color change.

This treatment can be applied to raw rubber or to compounded rubber which has been milled or molded into sheets or other forms and also to granules of rubber. The rubber so treated may be natural, synthetic or mixtures of the natural and synthetic varieties in any proportions.

*Example II*

3% of octadecylammonium bentonite are slurried with 25% aromatic naphtha and then 2.5% methyl alcohol are added slowly under vigorous agitation to produce a gel. To this are added 25% aromatic naphtha and 44.5% ethyl alcohol.

*Example III*

10% octadecylammonium bentonite are slurried with 80% aromatic naphtha and then 10% methyl alcohol are added slowly under vigorous agitation.

*Example IV*

3% of an organophylic bentonite containing 34 carbon atoms in the amine chain are slowly added under stirring in 50% toluol and agitated until a smooth gel is formed, after which it is diluted with the remaining 47% toluol. In lieu of the toluol, any of the polar as well as non-polar organic solvents may be used.

*Example V*

20% octylammonium bentonite, which is an organophylic bentonite containing 8 carbon atoms in the amine chain, are slurried with 40% of xylol under agitation, then 20% of an equal mixture of acetone and ethyl alcohol are added and agitated until a smooth gel is formed, after which 20% hexane are added.

The gels prepared in Examples II to V may be used for the purposes of this invention, just like the gel in Example I. Gels prepared with other alkylamine bentonites having 6 to 34 carbon atoms in the amine chain and replacing the alkylamine bentonites in the foregoing examples, in whole or in part, may also be used for this invention. Gels of other organophylic clays that will gel in alcohols and naphthas may be employed with some degree of success, but the modified bentonites are much preferred.

The quantity of organophylic bentonite in the gel may vary from 0.25% to 20% by weight. In all of the examples herein, the percentages are given by weight. The boiling point of the organic solvents, polar as well as non-polar, should be 35° to 300° C.

Aromatic naphtha will effect only moderate gelling of the octadecylammonium bentonite, and an alcohol is added to produce the optimum gelling. In lieu of methyl alcohol, many other alcohols can be used, such as ethyl, propyl, butyl and amyl alcohols and those with 6 and more carbon atoms. Cyclic alcohols, such as cyclohexanol, may be used also. The alcohols may be replaced by other polar solvents, such as esters, e. g. methyl, ethyl, propyl, isopropyl, butyl and amyl acetates, etc., or the ketones, e. g. acetone, methyl ethyl ketone, methyl isobutyl ketone, di-isobutyl ketone, cyclohexanone, etc. The aromatic naphthas, benzol, toluol and xylol, may be replaced by other non-polar solvents, such as aliphatic hydrocarbons with boiling points from 35° to 300° C. Mixtures of aliphatic and aromatic hydrocarbons may be used as well as mixtures of any polar solvents here mentioned.

The velvety flat or off-gloss finish of alkylamine bentonite on the rubber is essentially colorless, but does have enough hiding power to detract from the brilliance of colored surfaces coated with it, especially dark colored surfaces. Black surfaces appear to turn grayish; dark greens appear whitish or milky; light colors, especially white, turn toward a muddy color.

The finish on the rubber can be increased in flatness and improved in color by incorporating in the alkylamine bentonite gel composition, before treatment of the rubber therewith, inorganic or organic pigment, e. g. such black pigments including carbon black, lamp black, bone black, iron oxide black, etc., white pigments, such as titanium oxide, and reds, yellows, blues, greens, etc.

*Example VI*

0.5 oz. carbon black and 4.5 ozs. octadecylammonium bentonite are slurried with 40 ozs. aromatic naphtha and 5 ozs. methyl alcohol and ground in a pebble mill for about 2 hours, after which 36 ozs. ethyl alcohol is added and grinding continued for about 15 minutes. This is removed from the grinder and diluted up to 400 ozs. with a mixture of equal parts of aromatic naphtha and ethyl alcohol. The resulting composition is applied to the rubber surface as in Example I.

*Example VII*

An equal weight of titanium dioxide pigment is substituted for the carbon black in Example VI.

*Example VIII*

An equal weight of iron oxide red pigment is substituted for the carbon black in Example VI.

By using inert or extender pigments, such as talc, calcium carbonate, silica, china clay, mica, etc., in lieu of carbon black in Example VI, the extender will increase the flatness of the finish when the composition is applied to the rubber surface, but there will be no improvement in color.

*Example IX*

An ounce of micronized talc is substituted for the carbon black in Example VI.

Instead of the grinding operation employed in Examples VI to IX, the pigments as well as the extender pigments can be predispersed separately in part of the polar and/or non-polar solvent and then mixed with the rest of the composition containing the alkylamine bentonite.

Where improvement in color of the finish on the rubber is sought, but increase in flatness is unimportant, a solution of a dye in polar and/or non-polar solvent may be added to the composition containing the alkylamine bentonite.

*Example X*

To the composition produced in Example I, add 5% by weight of a 10% solution of nigrosine black in methyl alcohol.

The present invention is not limited to the specific details set forth in the foregoing examples which should be construed as illustrative and not by way of limitation and, in view of the numerous modifications which may be effected therein without departing from the spirit and scope of this invention it is desired that only such limitations be imposed as are indicated in the appended claims.

This application is a continuation-in-part of application Serial Number 198,222, filed November 29, 1950, and now abandoned.

We claim as our invention:

1. A process of rendering the surfaces of soft and semi-soft rubber non-tacky, which consists in coating the rubber with an organophylic alkylamine bentonite containing 6 to 34 carbon atoms in the amine chain and gelled in an organic solvent and then permitting the coating to dry.

2. The process claimed in claim 1, wherein the organophylic alkylamine bentonite is octadecylammonium bentonite.

3. The process claimed in claim 1, wherein the organophylic alkylamine bentonite is octylammonium bentonite.

4. The process claimed in claim 1, wherein the organophylic alkylamine bentonite is an alkylamine bentonite containing 34 carbon atoms in the amine chain.

5. As an article of manufacture, a soft rubber having a coating of an organophylic alkylamine bentonite containing 6 to 34 carbon atoms in the amine chain.

6. As an article of manufacture, a soft rubber having a superficial coating of octadecylammonium bentonite.

7. As an article of manufacture, a soft rubber having a superficial coating of octylammonium bentonite.

8. As an article of manufacture, a soft rubber having a superficial coating of an alkylamine bentonite containing 34 carbon atoms in the amine chain.

9. A process of rendering the surfaces of soft and semi-soft rubber non-tacky, which consists in coating the rubber with an organophylic alkylamine bentonite containing 6 to 34 carbon atoms in the amine chain and gelled in an organic solvent and containing a member of the group consisting of inorganic pigments, organic pigments, extender pigments and organic dyes and then permitting the coating to dry.

10. As an article of manufacture, a soft rubber having a coating of an organophylic alkylamine bentonite containing 6 to 34 carbon atoms in the amine chain and a member of the group consisting of inorganic pigments, organic pigments, extender pigments and organic dyes.

References Cited in the file of this patent

UNITED STATES PATENTS

| | | |
|---|---|---|
| 2,147,312 | Partridge | Feb. 14, 1939 |
| 2,262,689 | McDowell et al. | Nov. 11, 1941 |
| 2,389,855 | Johnson | Nov. 27, 1945 |
| 2,431,873 | Kennelly | Dec. 2, 1947 |
| 2,531,396 | Carter et al. | Nov. 28, 1950 |
| 2,531,825 | Peterson et al. | Nov. 28, 1950 |

OTHER REFERENCES

The Journal of Physical and Colloid Chemistry, vol. 53 of 1949, pp. 294 to 306, inclusive.